(12) United States Patent
Rizzo et al.

(10) Patent No.: US 9,634,725 B2
(45) Date of Patent: Apr. 25, 2017

(54) ANTICOLLISION MECHANISM FOR AN NFC DEVICE

(71) Applicant: STMicroelectronics (Rousset) SAS, Rousset (FR)

(72) Inventors: Pierre Rizzo, Trets (FR); Nathalie Vallespin, Greasque (FR); Emmanuel Papart, Aix en provence (FR)

(73) Assignee: STMicroelectronics (Rousset) SAS, Rousset (FR)

(*) Notice: Subject to any disclaimer, the term of this patent is extended or adjusted under 35 U.S.C. 154(b) by 0 days.

(21) Appl. No.: 15/217,430

(22) Filed: Jul. 22, 2016

(65) Prior Publication Data

US 2016/0329932 A1  Nov. 10, 2016

Related U.S. Application Data

(62) Division of application No. 14/209,132, filed on Mar. 13, 2014, now Pat. No. 9,425,862.

(30) Foreign Application Priority Data

Mar. 15, 2013 (FR) ...................... 13 52324

(51) Int. Cl.
 *H04B 5/00* (2006.01)
(52) U.S. Cl.
 CPC ......... *H04B 5/0025* (2013.01); *H04B 5/0043* (2013.01); *H04B 5/0056* (2013.01)
(58) Field of Classification Search
 CPC .................................................. H04B 5/0056
 See application file for complete search history.

(56) References Cited

U.S. PATENT DOCUMENTS

| 6,905,074 B2* | 6/2005 | Charrat ............... G06K 7/0008 235/492 |
| 7,907,056 B2 | 3/2011 | Shimizu |
| 2005/0077356 A1 | 4/2005 | Takayama et al. |
| 2006/0148534 A1* | 7/2006 | Shih .................. H04W 52/0251 455/574 |
| 2008/0268906 A1 | 10/2008 | Ohmoto |
| 2012/0329389 A1 | 12/2012 | Royston et al. |
| 2014/0073242 A1 | 3/2014 | Chen et al. |

FOREIGN PATENT DOCUMENTS

| EP | 2 339 501 A1 | 6/2011 |
| EP | 2 390 817 A1 | 11/2011 |
| WO | 03/052672 A1 | 6/2006 |

OTHER PUBLICATIONS

French Search Report and Written Opinion, dated Dec. 20, 2013, for French Application No. 13/52324.

(Continued)

*Primary Examiner* — Tuan H Nguyen
(74) *Attorney, Agent, or Firm* — Seed IP Law Group LLP

(57) ABSTRACT

A device includes near-field communication (NFC) control circuitry and transceiver circuitry. The transceiver circuitry is coupled to the NFC control circuitry. In a reader mode of operation, the NFC circuitry detects reception of NFC polling frames by the transceiver circuitry. When reception of an NFC polling frame is detected, the NFC control circuitry switches from the reader mode of operation to a card mode of operation.

11 Claims, 2 Drawing Sheets

(56) References Cited

OTHER PUBLICATIONS

International Standard, ISO/IEC 18092, "Information Technology—Telecommunications and Information Exchange Between Systems—Near Field Communication—Interface and Protocol (NFCIP-1)," First Edition, Apr. 1, 2004, 66 pages.

International Standard, ISO/IEC 14443-4, "Identification Cards—Contactless Integrated Circuit(s) cards—Proximity Cards—Part 4: Transmission protocol," Second Edition, Jul. 15, 2008, 8 pages.

\* cited by examiner

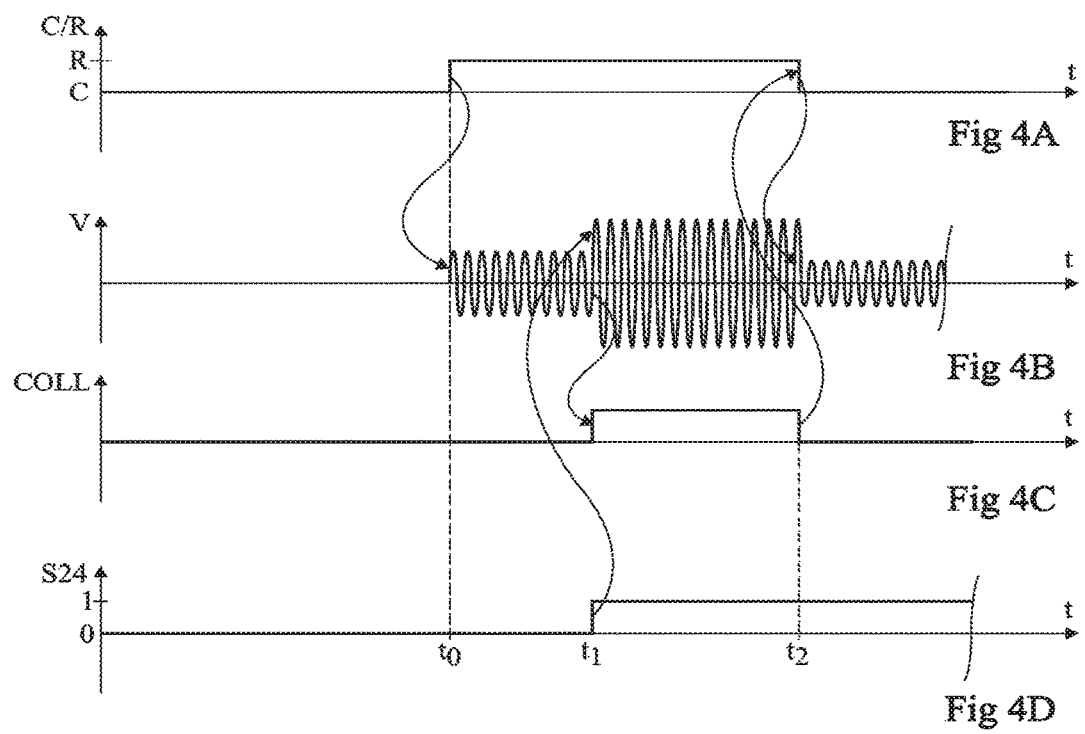

ANTICOLLISION MECHANISM FOR AN NFC DEVICE

BACKGROUND

Technical Field

The present disclosure generally relates to electronic devices and circuits and, more specifically, to NFC (Near Field Communication) devices.

Discussion of the Related Art

More and more portable communication devices (for example, cell phones) are equipped with NFC-type near field communication systems. The principle is to have a same device capable of operating either as an electromagnetic transponder or an electronic tag (card mode) communicating with another mobile device or with a terminal emitting a high-frequency electromagnetic field, or as an electromagnetic transponder reader (reader mode) generating a field capable of being detected by other devices configured in card mode or by other types of transponders.

A same device however has to select the card or reader mode in which it operates. In practice, the device has a card mode default configuration and is only placed in reader mode under the effect of a control signal triggered by one of the applications of the device.

To avoid having two devices located close to each other simultaneously start operating in reader mode, which would adversely affect any communication, anticollision mechanisms are provided. However, such mechanisms do not avoid all collisions, in particular, when an NFC device is in the field of a read/write terminal, called previous-generation terminal, which does not comply with the NFC Forum and ISO 18092 standards, and only complies with ISO standard 14443.

SUMMARY

An embodiment overcomes all or part of the disadvantages of known anticollision mechanisms.

Another embodiment provides an anticollision mechanism more specifically intended for situations where an NFC device is close to a read/write terminal which does not comply with NFC standards.

Another embodiment provides a solution requiring no modification of the read/write terminals.

Another embodiment provides a solution which does not delay the completion of a near-field communication.

Another embodiment provides a solution compatible with other usual anticollision mechanisms.

An embodiment provides an anticollision method for an NFC device, comprising:

in reader mode, monitoring a variation of a piece of information representative of the amplitude of the signal in an antenna of the device; and if this piece of information exceeds a threshold, the device is switched to the card mode.

According to an embodiment, said piece of information corresponds to a voltage level received by a demodulator of the device.

According to an embodiment, said threshold corresponds to a variation of several tens of percents of said amplitude, preferably on the order of 30%.

A near-field communication device comprising a near-field communication circuit, capable of implementing the above method, is also provided.

The foregoing and other features and advantages will be discussed in detail in the following non-limiting description of specific embodiments in connection with the accompanying drawings.

BRIEF DESCRIPTION OF THE DRAWINGS

FIGS. 4A, 4B, 4C, and 4D are timing diagrams illustrating the operation of an embodiment of an anticollision mechanism.

DETAILED DESCRIPTION

Figure 1:
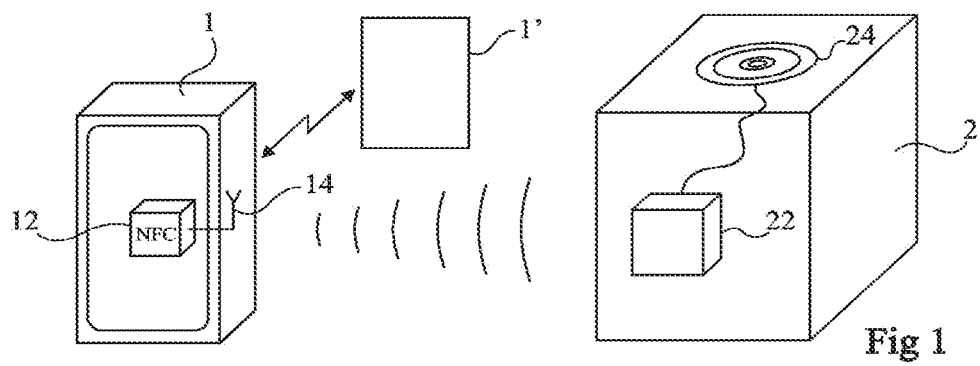
FIG. 1 is a very simplified representation of a near-field communication system corresponding to an application of the embodiments which will be described.

The same elements have been designated with the same reference numerals in the different drawings, where the timing diagrams have been drawn out of scale. For clarity, only those steps and elements which are useful to the understanding of the embodiments which will be described have been detailed. In particular, the generation of the signals to be transmitted and the processing of the received signals have not been detailed, the described embodiments being compatible with current techniques of signal generation and processing according to NFC standards. Further, the other devices generally associated with an NFC router in a mobile communication device and with an electromagnetic transponder reader according to ISO standards have not been detailed either, the described embodiments being here again compatible with current devices.

FIG. 1 very schematically shows a near-field communication system involving one or several mobile NFC-type communication devices 1 and an electromagnetic transponder reader 2 (for example, a terminal controlling the access to a building, a transport ticket validation terminal, etc.) complying with ISO electromagnetic transponder communication standards. This drawing illustrates an anticollision situation, that the mechanism which will be described more specifically aims at solving. For simplification, the usual operation according to NFC standards between two mobile communication devices (for example, two cell phones), one in card mode and the other in reader mode, has not been illustrated, since this operation is not modified.

Read/write terminal 2 of electromagnetic transponders comprises various circuits, not shown, depending on the application for which this terminal is intended. Whatever this application, the terminal comprises electronic circuits (symbolized by a block 22) for generating a radio frequency signal (typically at 13.56 MHz) sent onto an antenna 24 belonging to an oscillating circuit for generating a high-frequency electromagnetic field. This field is intended to be detected by electromagnetic transponders located within its range. These transponders now comprise NFC devices operating in card mode.

Device 1 is equipped with an NFC router 12 capable of switching between a card mode and a reader mode according to its situation. More specifically, NFC routers are in card mode when idle, to be woken up when an antenna 14 comprised therein detects an electromagnetic field generated by a reader 2 or another device operating in reader mode. Conversely, when an NFC device desires to emit an electromagnetic field capable of being detected by other devices in card mode (not shown), it behaves as a reader and starts emitting a high-frequency electromagnetic field of the type emitted by terminal 2. In the example of FIG. 1, device 1 is assumed to desire to communicate with an electromagnetic transponder 1' of contactless card type.

Existing anticollision mechanisms (described in the "NFC Forum IP1" and in ISO standard 18092) comprise, for an NFC router, only communicating in reader mode if antenna 14 receives no signal, that is, if it is not in the field of another device which would already be in reader mode. Once in reader mode, the NFC router emits a radio frequency signal in the form of a modulation carrier, in the same way as a usual electromagnetic transponder read terminal, until the end of a communication (for example, with transponder 1'), at the end of which the router switches back to the card mode.

Such anticollision mechanisms have a satisfactory operation between two NFC-type devices. However, when an NFC device is within the range of a previous-generation ISO read/write terminal, that is, which does not implement the anticollision mechanisms provided by the NFC standard, problems are likely to appear.

In the presence of a terminal 2 which permanently emits an electromagnetic field, an NFC device located within its range will never switch to reader mode due to its usual anticollision mechanism, and a correct operation is preserved.

However, most terminals 2 do not permanently emit, for power saving reasons. In the idle state, they periodically emit very short radio frequency frames (typically on the order of some hundred milliseconds, once or four times per second) and only leave this idle mode to emit continuously once they have detected that a transponder has captured the field emitted during a polling frame. In such a case, an NFC device (for example, device 1) desiring to switch to the reader mode between two frames of polling of a terminal 2, will be allowed to do so by a usual anticollision mechanism. Device 1 will remain in reader mode as long as it will have not finished the communication determined by the application having started the reader mode. Now, terminal 2 is capable of starting to emit again (if only during polling frames) and such emissions generate collisions in communications between device 1 and another neighboring device (the transponder) in card mode with which it desires to communicate.

It is thus provided to add, to usual anticollision devices implemented by the NFC device, an additional mechanism according to which, in reader mode, the NFC device detects the possible presence of another field to then interrupt its communication and switch back to the card mode.

Figure 2:
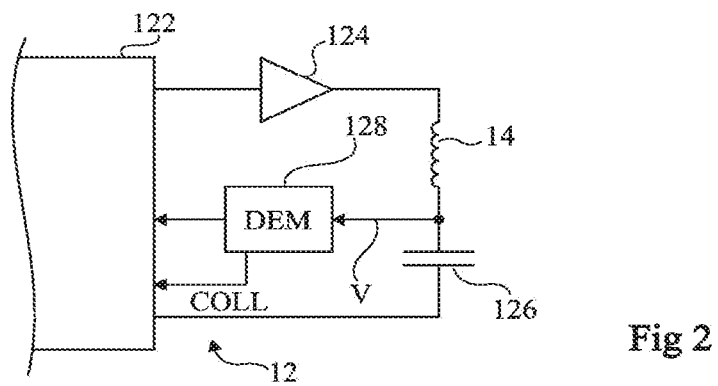
FIG. 2 very schematically illustrates an example of NFC router transceiver head.

FIG. 2 very schematically shows a radio frequency transceiver head of the type equipping an NFC router. Various electronic circuits symbolized by a block 122 have the function of generating the various signals to be emitted and to process the received signals. The signals to be emitted are sent via an emission amplifier 124 to an oscillating circuit (for example, in series) formed of an inductive element forming antenna 14 and of a capacitive element 126 for generating, in reader mode, a high-frequency field. A demodulator 128 is in charge of detecting and of using a disturbance of the high-frequency emitted field to decode the response of a device in card mode loading antenna 14.

When it is in card mode, router 12 emits nothing but detects a possible radio frequency signal sensed by its antenna 14 and then communicates with the device emitting this field, for example, with terminal 2, by modifying the load that it forms on the generated electromagnetic field. This card mode operation has not been illustrated in FIG. 2.

The provided anticollision mechanism comprises, when device 1 has switched to the reader mode, permanently looking for the appearing of a variation of strong amplitude of the envelope of the signal sensed by demodulator 128. The presence of such a variation indeed means that another electromagnetic field interferes with the field emitted by antenna 14.

Advantage is taken from the fact that in normal operation, the envelope variation of the signal of antenna 14 under the effect of the load of a device in card mode communicating with device 1 is small (typically of a few percents). It is thus possible to set a threshold (for example, of a few tens of percents, typically on the order of 30%) from which it can be reliably considered that such an envelope variation is caused by an additional field, and thus by a collision.

Figure 3:
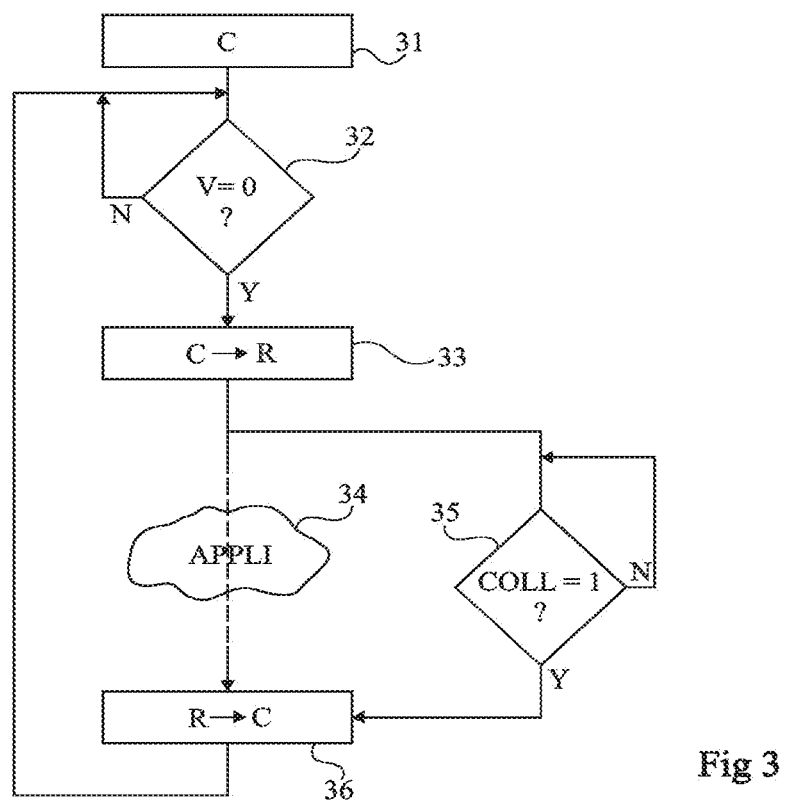
FIG. 3 shows, in the form of blocks, an embodiment of an anticollision method.

FIG. 3 is a block diagram illustrating an implementation mode of the anticollision mechanism.

FIGS. 4A, 4B, 4C, and 4D illustrate in the form of timing diagrams the operation of this mechanism. FIG. 4A symbolically shows the card or reader mode of device 1 in the form of a signal C/R of activation of its field. FIG. 4B illustrates a very simplified example of the variation of a voltage V present at the input of demodulator 128. FIG. 4C illustrates the state of possible collision signal COLL provided by demodulator 128 to circuit 122. FIG. 4D illustrates the periods during which terminal 2 emits a field, in the form of a signal S24 symbolizing the presence (level 1) or the absence (level 0) of a field generated by antenna 24.

In the idle state, device 1 is in card mode (block 31, C, FIG. 3). This corresponds to the initial situation of the timing diagrams of FIGS. 4A to 4D. When it is card mode, device 1 may be in a situation where it captures the field of reader 2 to complete a communication therewith. This usual operation has not been illustrated.

It is assumed that at a time t0, device 1 desires to communicate in reader mode. To achieve this, its starts by verifying (block 32, V=0?) that no signal is sensed by its antenna 14. If not (output N of block 32), it remains in card mode. If reader 2 does not emit (and no other NFC device emits around), device 1 switches to the reader mode (block 33, C->R) and starts emitting an electromagnetic field to communicate, for example, with another NFC device which could be nearby or with a contactless card (1', FIG. 1) or another electromagnetic transponder.

Device 1 in reader mode then implements the steps provided by the application having started the reader mode (block 34, APPLI).

In parallel, its circuits 122 monitor the state of signal COLL. This is illustrated in FIG. 3 by a test (block 35 COLL=1?) which verifies the state of signal COLL (FIG. 4C). As long as this signal remains in the inactive state (arbitrarily 0), the test loops back.

However, if the demodulator detects an abrupt envelope variation (example of time t1 in the timing diagrams of FIGS. 4A to 4D), signal COLL switches state (FIG. 4C) and this causes the switching of device 1 to the card mode (block 36 R->C) at time t2. As a result, at the level of antenna 14 and of the demodulator (signal V), only the field emitted by terminal 2 can be seen.

The time scale has not been respected in the timing diagrams of FIGS. 4A and 4D. The interval between times t1 and t2 in practice corresponds to the time necessary for the detection and the switching of device 1 to the card mode.

Advantage is taken from the fact that in normal operation, the envelope variation of the signal of antenna 14 under the effect of the load of a device in card mode communicating with device 1 is small (typically of a few percents). It is thus possible to set a threshold (for example, of a few tens of percents, typically on the order 30%) from which it can be reliably considered that such an envelope variation is caused by an additional field, and thus by a collision.

An advantage of the described embodiments is that they are compatible with usual anticollision mechanisms.

Another advantage of the described embodiments is that they require no modification of existing read-write terminals and are thus compatible with ISO terminals.

Various embodiments have been described, various alterations and modifications will occur to those skilled in the art. In particular, the selection of the threshold beyond which a collision is considered depends on the sensitivity of the demodulator and may vary. More generally, it is possible to process any piece of information representative of the amplitude of the signal in an antenna, and to detect a variation of this piece of information which corresponds to an envelope variation of several tens of percents. Further, the practical implementation of the anticollision mechanism is within the abilities of those skilled in the art based on the functional indications given hereabove and using techniques usual per se.

Such alterations, modifications, and improvements are intended to be part of this disclosure, and are intended to be within the spirit and the scope of the present disclosure. Accordingly, the foregoing description is by way of example only and is not intended to be limiting.

The invention claimed is:

1. A device, comprising:
near-field communication (NFC) control circuitry; and
transceiver circuitry coupled to the NFC control circuitry, wherein the NFC control circuitry, in a reader mode of operation,
detects reception of NFC polling frames by the transmission circuitry; and
when reception of an NFC polling frame is detected, changes from the reader mode of operation to a card mode of operation.

2. The device of claim 1 wherein the transceiver circuitry comprises an antenna, an amplifier, a demodulator and a capacitor, and the NFC control circuitry detects reception of NFC polling frames by monitoring a variation of an amplitude of an envelope of a signal.

3. The device of claim 2 wherein the NFC control circuitry detects reception of NFC polling frames by comparing the variation of the amplitude to a threshold variation.

4. A system, comprising:
one or more nodes, which, in operation, receive and output signals; and
near-field communication (NFC) router circuitry coupled to the one or more nodes, wherein the NFC router circuitry, in operation:
detects NFC polling frames; and
when an NFC polling frame is detected in a reader mode of operation of the NFC router circuitry, changes from the reader mode of operation to a card mode of operation of the NFC router circuitry.

5. The system of claim 4 wherein the NFC router circuitry detects reception of NFC polling frames by monitoring a variation of an amplitude of an envelope of a signal.

6. The system of claim 4 wherein the NFC router circuitry detects reception of NFC polling frames by comparing the variation of the amplitude to a threshold variation.

7. The system of claim 4, comprising NFC transceiver circuitry coupled to at least one of the one or more nodes.

8. The system of claim 7, comprising one or more application processors coupled to the NFC router circuitry.

9. A method, comprising:
in a reader mode of operation of a near-field communication (NFC) device, detecting, by the NFC device, reception of NFC polling frames; and
when reception of an NFC polling frame is detected by the NFC device, switching, by the NFC device, from the reader mode of operation to a card mode of operation.

10. The method of claim 9 wherein the detecting of NFC polling frames comprises monitoring a variation of an amplitude of an envelope of a signal.

11. The method of claim 10 wherein the detecting NFC polling frames comprises comparing the variation of the amplitude to a threshold variation.

* * * * *